United States Patent [19]

Wulf

[11] 4,295,520
[45] Oct. 20, 1981

[54] HEAT TRANSFER SYSTEM

[75] Inventor: Helmut Wulf, Ostfildern, Fed. Rep. of Germany

[73] Assignee: Daimler-Benz Aktiengesellschaft, Stuttgart, Fed. Rep. of Germany

[21] Appl. No.: 56,234

[22] Filed: Jul. 10, 1979

[30] Foreign Application Priority Data

Sep. 8, 1978 [DE] Fed. Rep. of Germany ....... 2834838

[51] Int. Cl.³ .......................... F28D 15/00; B60H 1/04
[52] U.S. Cl. ........................................ 165/41; 165/46; 165/86; 165/104.21; 237/12.3 R
[58] Field of Search ....................... 165/46, 86, 41, 105

[56] References Cited
U.S. PATENT DOCUMENTS

| | | | |
|---|---|---|---|
| 3,332,476 | 7/1967 | McDougal | 165/51 |
| 3,604,503 | 9/1971 | Feldman, Jr. et al. | 165/46 |
| 3,913,665 | 10/1975 | Franklin et al. | 122/366 X |

*Primary Examiner*—Albert W. Davis
*Attorney, Agent, or Firm*—Craig and Antonelli

[57] ABSTRACT

A heat transfer system for transferring heat between a heat-emitting zone or heat source and a heat-consuming zone or heat sink in accordance with a heat pipe principle in cases where a limited relative movement takes place between the heat source and the heat sink. A bundle of small tubes extending essentially in parallel to one another and movable relative to one another is arranged at least along a partial zone of a heat transfer path between the heat source and the heat sink. Each individual tube of the bundle of tubes is constructed in accordance with the heat pipe principle.

24 Claims, 7 Drawing Figures

HEAT TRANSFER SYSTEM

The present invention relates to a heat transfer system for transferring heat between a heat source and a heat sink in accordance with the principles of a heat pipe.

A number of heat pipes as such have been proposed with such heat pipes being constructed as an evacuated hermetically tightly sealed hollow space made of a material of high heat conductivity such as, for example, copper or aluminum with the heat pipe preferably having the shape of a pipe or plate. Generally, a fraction of the hollow space of the heat pipe is filled with a vaporizable and condensible heat transfer medium with the selection of the heat transfer medium being dependent upon the temperature level at which heat is to be transferred.

Additionally, the heat pipe may be provided, on an inside thereof at least partially with a capillary structure for returning the condensed heat transfer medium from the heat emitting point to the heat absorbing point. Such heat transfer may be accomplished by, for example, lining of the pipe with a mesh screen or by imparting to the inner pipe surface a grooved structure.

In proposed heat pipes, suitable filling media are, for the present purposes, for example, ammonia, water, or a mixture of alcohol and water. The thus introduced medium into the heat pipe evaporates at the hot spot of the heat pipe where the thermal energy is supplied and rapidly expands in the interior of the heat pipe. At heat-emitting zones of the heat pipe, the evaporated medium is precipitated and condenses giving off its heat to the wall of the heat pipe. Due to the capillary effect, the condensate creeps back from the heat emitting zone to the heat supply zones of the heat pipe. The amount of heat transferred to the wall of the heat pipe by the medium on the condensate side is removed on the outside by radiation, convection, or by thermal conduction.

Since a phase change of the heat transfer medium occurs at the heat-absorbing and/or heat-emitting zone of the heat pipe, it is essentially the transformation energy required for the phase change which is transferred in heat form. Since the transformation energies, based on the mass of the heat transfer medium, are substantially larger than the amounts of energy which can be stored by the heating of a medium, it is possible, by transporting relatively small amounts of heat transfer medium, to transfer a large amount of heat even over rather large distances. Additionally, by imposing a certain pressure on the interior of the heat pipe, it is also possible to ensure that the heat transfer takes place only up to a quite specific temperature.

Occasionally, it is required that heat transfer take place between a heat source and a heat sink which are movable relative to each other. For example, when applying the heat transfer principle such as described hereinabove to motor vehicle technology such relative motions may be caused by, for example, driving shocks or by engine vibrations. However, when heat exchangers are accommodated in vehicle doors, there is a problem of providing a heat transfer system which can participate in the pivotal motion of the vehicle door.

Although it would be possible, when using a hot water circulation system, to bridge zones of relative displacement by arranging a pair of hose conduits for supplying and removing the circulating hot water, this presupposes the use of a hot water circulation system which, based on the heating quantity to be transferred, is relatively heavy. When using the specifically substantially more lightweight heat transfer pipe, hose conduits cannot be used since, due to their flexibility, they are neither dimensionally resistant against external excess pressure nor are such hoses absolutely vacuum-tight.

The aim underlying the present invention essentially resides in providing an arrangement by which it is possible to bridge zones of relative movement between a heat source and a heat sink when employing a heat transfer system operable in accordance with the heat pipe principle.

According to advantageous features of the present invention, a heat transfer system for transferring heat between a heat emitting zone and a heat consuming zone in accordance with the heat pipe principle wherein limited relative movement takes place between the heat source and heat sink, a bundle of small tubes extending essentially in parallel to one another and movable relatively to one another is arranged at least along a partial zone of the heat transfer path between both the heat source and the heat sink with each individual tube of the bundle being fashioned in accordance with the heat pipe principle.

By virtue of subdividing the heat transfer pipe into a bundle of parallel extending small tubes, each of which are individually movable, the required mobility of the heat transfer system has been attained. However, the vacuum-tightness is also likewise ensured.

A counter current stream of vapors or steam of the filling media in one direction and of the condensate in the opposite direction can be maintained safe in operation even in situations wherein the inside tube diameter is about 3 mm. Moreover, due to the fact that a tube cross-section is provided which, in total, is larger as compared to a cross-section area of the normal heat transfer pipe, a certain increase in flow resistance within the tubes can be compensated.

In accordance with further advantageous features of the present invention, the heat transfer system is applied to the heating of heat exchangers in pivotal doors of motor vehicles wherein, in the region of the pivot axis of the door, a heat transfer means is arranged as the heat source at a fixed point, preferably in proximity to the floor, with the tube bundle designed for twisting stress, being arranged concentrically to the pivot axis of the door.

According to the present invention, the heat pipe may be broken up, at least along partial sections of its longitudinal extension into a bundle of small tubes which extend essentially in parallel to one another with the tubes themselves being movable relative to one another and each tube being designed as a heat pipe, and with these tubes being sealed toward the outside and open toward the interior of an adjoining heat pipe or pipes. As noted above, the combined inside cross-sectional area of all the tubes of the bundle, in accordance with the present invention, is larger than the inside cross-section of an adjoining normal heat pipe.

Accordingly, it is an object of the present invention to provide a heat transfer system for transferring heat between a heat source and a heat sink which avoids, by simple means, shortcomings and disadvantages encountered in the prior art.

Another object of the present invention resides in providing a heat transfer system for transferring heat between a heat source and a heat sink which is readily useable in situations wherein there is relative movement between the heat source and heat sink.

A further object of the present invention resides in providing a heat transfer system for transferring heat between a heat emitting zone and a heat consuming zone which operates in accordance with the heat pipe principle.

Yet another object of the present invention resides in providing a heat pipe arrangement which is simple in construction and therefore relatively inexpensive to manufacture.

A further object of the present invention resides in providing a heat transfer system for transferring heat between a heat-emitting zone and a heat-consuming zone which functions reliably under all operating conditions.

These and other objects, features, and advantages of the present invention will become more apparent from the following description when taken in connection with the accompanying drawings which show, for the purposes of illustration only, two embodiments in accordance with the present invention, and wherein.

Figure 1:
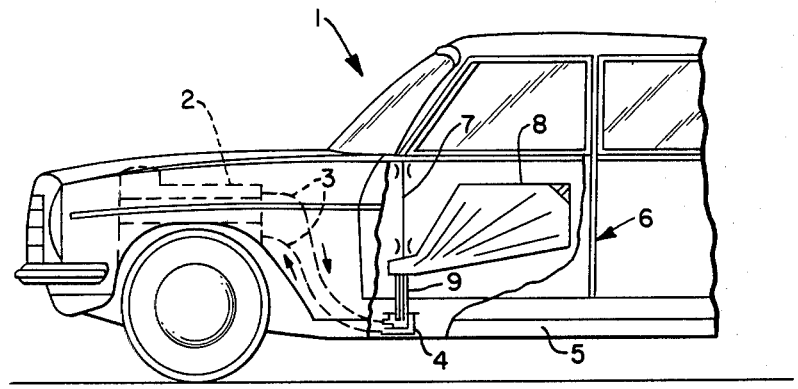
FIG. 1 is a partial schematic side view of a motor vehicle provided with a heat transfer system for heating the vehicle door in accordance with the present invention.

Referring now to the drawings wherein like reference numerals are used in both views to designate like parts and, more particularly to FIG. 1, according to this figure, a vehicle generally designated by the reference numeral 1 includes an internal combustion engine 2 for driving the vehicle with waste heat of the engine 2 being utilized, inter alia, for heating a plate heat exchanger 8 arranged in a door 6 of the vehicle 1. The vehicle door 6 is pivotally mounted in a conventional manner by two hinges which define a pivot axis 7. The plate heat exchanger 8 is a heat exchanger constructed in accordance with the heat pipe principle.

A conventional heat exchanger 4 for supplying the heat exchanger 8 with heat is arranged at a doorsill 5 in proximity of the vehicle floor in a zone of the pivot axis 7. The heat exchanger 4 is supplied with heating water from the internal combustion engine by way of a pair of flexible hose conduits 3. The plate heat exchanger 8 is provided with a projection which extends into a zone of the pivot axis 7 of the vehicle door 6. An underside of the plate heat exchanger 8 is constructed with a steady gradient toward the projection so that condensate of the heat transfer medium forming during a heat transfer with the use of the plate heat exchanger 8, fashioned according to the principle of a heat pipe, can be collected in the projection.

Figure 2:
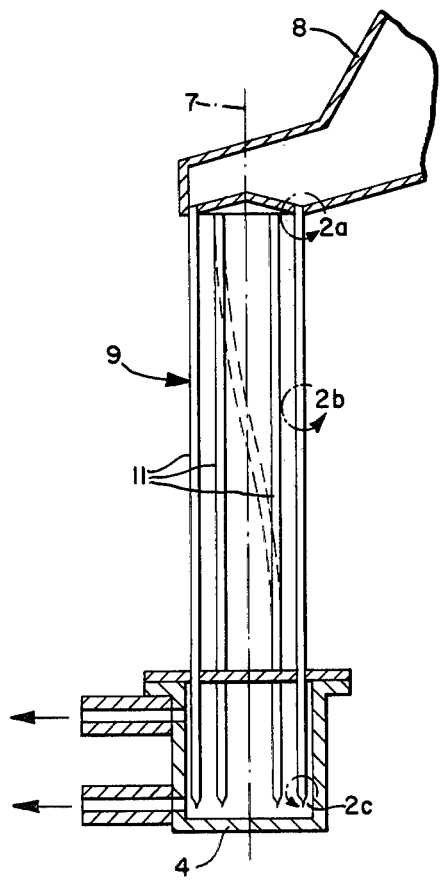
FIG. 2 is a partially schematic cross-sectional view of a tube bundle of the heat transfer system of FIG. 1.

A bundle generally designated by the reference numeral 9 of parallel-extending and individually freely movable small tubes 11 are provided for communicating an underside of the projection of the plate heat exchanger 8 with the heat exchanger 4. As shown most clearly in FIG. 2, the bundle 9 extends coaxially with the pivot axis 7 of the vehicle door 6.

Figure 2A:
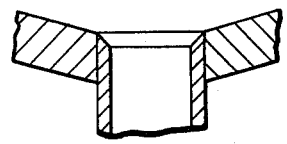
FIGS. 2a, 2b and 2c are enlarged detailed views illustrating the configuration of the tube bundle of FIG. 2.

As shown in the detailed view of FIG. 2a, the small tubes 11 are open toward an interior of the hollow plate heat exchanger 8. The tubes 11 are connected to the interior of the projection at the plate heat exchanger 8 in such a manner that the condensate collecting at that point can readily flow off into the tubes 11.

Figure 2B:
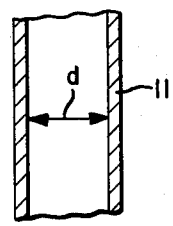
Figure 2C:
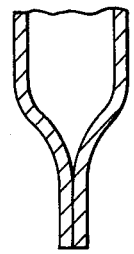

As shown in the detailed view of FIG. 2c, the lower ends of the tubes 11 are hermetically tightly sealed and extend into an interior of the tank-shaped heat exchanger 4. In the heat exchanger 4, the lower ends of the tubes 11 are surrounded by a flow of heating water so as to withdraw heat therefrom with the withdrawn heat being transferred to the plate heat exchanger 8. During an opening or closing of the vehicle door 7, the tube bundle 9 is twisted so that the tubes 11 are elastically bent or deformed in the manner of a steep helical line indicated in dashed lines in FIG. 2. The elastic deformation of the tubes 11 is due to the extensive slimness of the respective tubes 11.

The condensate creeps from the projection of the heat exchanger plate 8 along an inside of the tubes 11 in the form of a thin film back to the heat absorbing zone within the heat exchanger 4 with this return or creeping effect being supported by the force of gravity. As shown in FIG. 2b the tubes 11 have a diameter d by which there is no droplet or meniscus formation within the tube 11. Consequently, the vapors produced at the heat-absorbing zone of the tube 11 can freely escape in an upward direction from the tube 11 into the interior of the plate heat exchanger 8. The diameter d of the tubes 11 should be at least 3 mm, and preferably be in the range of 3–5 mm.

Depending on the heat requirements, if the size of the heat exchanger 4 required to produce the necessary heating power for transferring heat to the bundle 9 would be such that it could no longer be accommodated within the vehicle door 6 without, for example, impairing the movement of the structural parts 4 and operation of the windows which must be housed in the vehicle door 6, then the heat exchanger 4 must be arranged outside of the vehicle door 6 with the further heat transfer from the heat exchanger 4 into the interior door and plate heat exchanger 8 then being effected by a more lightweight and more compact heat pipe construction.

Figure 3:
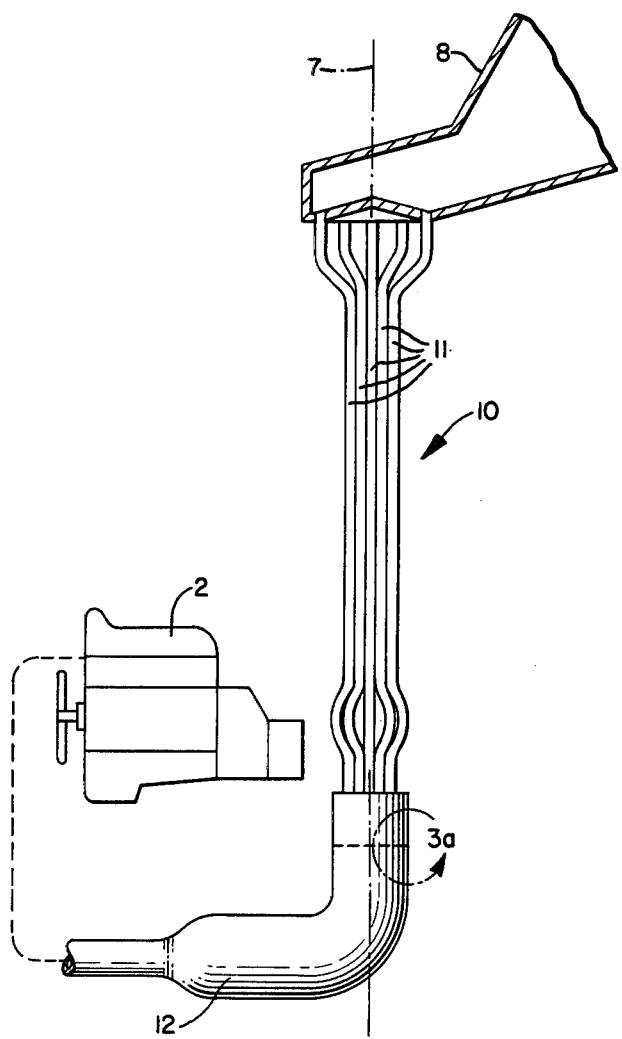
FIG. 3 is a partial cross-sectional schematic view of a further embodiment of a heat transfer system in accordance with the present invention.
Figure 3A:
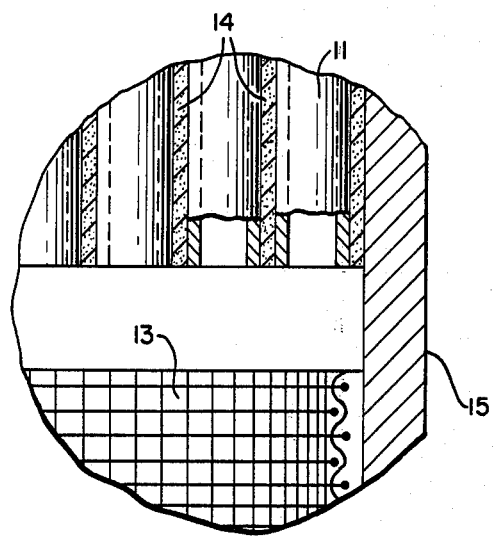
FIG. 3a is an enlarged detailed view of the tube bundle and heat pipe of the transfer system of FIG. 3.

In the embodiment of FIG. 3, the entire heat transfer from the internal combustion engine 2 up to the plate heat exchanger 8 is housed in the interior of the door with the heat transfer taking place in accordance with the heat pipe principle. For this purpose, a heat pipe 12, constructed in a conventional manner, is provided which has a relatively large diameter with respect to the diameters of the individual tubes 11. The heat pipe 12 is fixedly mounted and extends in this manner into a zone of the pivot axis 7 of the vehicle door 6. The heat pipe 12 is somewhat enlarged in its diameter so as to form an elbow 15 by means of which the heat transfer is deflected in a direction of the pivot axis 7 of the vehicle door 6. Downstream of the elbow 15, the heat pipe 12 is broken up into a bundle generally designated by the reference numeral 10 of individual tubes 11 which, under hermetic sealing action, are soldered into one end of the elbow 15 by means of solder 14 (FIG. 3a). To ensure a free movability of the soldered-in tubes 11 in a zone outside of the elbow 15, the tubes 11 are temporarily radially bent outward toward the outside of the bundle 10 above the soldering location and then recombined.

In the heat transfer system of FIG. 3, the tubes 11 are closely packed within the bundle 10 so that, during twisting, the deformations are particularly minor. To effect a connection to the projection of the plate heat exchanger 8, the individual tubes 11 are radially bent toward the outside in a substantially Z-shape so as to attain a larger peripheral spacing of the soldering locations of the individual tubes 11.

In the interior of the tubes 11, no special means need be provided for returning the condensate since the total tube surface is large and the return of the condensate takes place in the same direction as the force of gravity.

In the enlarged section or elbow 15 and in the normal section of the heat pipe 12, a screen insert 13 is provided for transporting the condensate. The elbow 15 passing over into the tubes 11 is, with respect to its diameter, adapted to an outer diameter of the tube bundle 10 which outer diameter is naturally larger than the diameter of a uniform pipe of equal cross-section, especially since the total cross-section of the tubes 11 of the bundle 10, as noted above, is larger than the cross-section of the heat pipe 12.

While I have shown and described only two embodiments in accordance with the present invention, it is understood that the same is not limited thereto but is susceptible of numerous changes and modifications as known to one having ordinary skill in the art, and I therefore do not wish to be limited to the details shown and described herein, and intend to cover all such modifications as are encompassed by the scope of the appended claims.

I claim:

1. A heat transfer system for transferring heat between a heat-emitting zone and a heat-consuming zone in accordance with a heat pipe principle, characterized in that the heat-emitting zone and the heat-consuming zone are mounted for limited relative movement, a bundle of elastically deformable small tubes extending essentially in parallel to one another and movable relative to one another exclusively forms a heat transfer path between both the heat-emitting zone and the heat-consuming zone for communicating the heat-emitting zone with the heat-consuming zone, and in that each individual tube of the bundle of small tubes is constructed so as to enable vapor produced in the heat-emitting zone to flow inside of the respective tubes into the heat-consuming zone and condensate produced in the heat-consuming zone to return inside the respective tubes to the heat-emitting zone.

2. A heat transfer system according to claim 1, characterized in that each of the tubes has an inside diameter in the range of about 3–5 mm.

3. A heat-transfer system arranged in a pivotable door of a motor vehicle, for transferring heat between a heat-emitting zone and a heat-consuming zone in accordance with a heat pipe principle, characterized in that the heat-emitting zone and the heat-consuming zone are mounted for limited relative movement, a bundle of elastically deformable small tubes extending essentially in parallel to one another and movable relative to one another is arranged at least along a partial zone of a heat transfer path between both the heat-emitting zone and the heat-consuming zone for communicating the heat-emitting zone with the heat-consuming zone, each individual tube of the bundle of small tubes is constructed so as to enable vapor produced in the heat-emitting zone to flow into the heat-consuming zone and condensate produced in the heat-consuming zone to return to the heat-emitting zone, the heat-emitting zone is formed as a heat exchanger means arranged in an area of a pivot axis of the pivotable door at a fixed point, and in that the bundle of tubes is arranged concentrically to the pivot axis of the pivotable door.

4. A heat transfer system according to claim 3, characterized in that the bundle of tubes is constructed so as to be elastically deformable when subjected to a twisting stress during a pivoting of the pivotal door.

5. A heat transfer system according to claim 4, characterized in that the heat transfer means is arranged in proximity to a floor of the motor vehicle.

6. A heat transfer system according to claim 3, characterized in that each of the tubes has an inside diameter in the range of about 3–5 mm.

7. A heat transfer system according to claim 6, characterized in that the bundle of tubes is constructed so as to be elastically deformable when subjected to a twisting stress during a pivoting of the pivotal door.

8. A heat transfer system according to claim 7, characterized in that the heat transfer means is arranged in proximity to a floor of the motor vehicle.

9. A heat transfer system arranged in a pivotable door of a motor vehicle for transferring heat between a heat-emitting zone and a heat-consuming zone in accordance with a heat pipe principle, characterized in that the heat-emitting zone and the heat-consuming zone are mounted for limited relative movement, a bundle of elastically deformable small tubes extending essentially in parallel to one another and movable relative to one another is arranged at least along a partial zone of a heat transfer path between both the heat-emitting zone and the heat-consuming zone for communicating the heat-emitting zone with the heat-consuming zone, each individual tube of the bundle of small tubes is constructed so as to enable vapor produced in the heat-emitting zone to flow into the heat-consuming zone and condensate produced in the heat-consuming zone to return to the heat-emitting zone, the heat-consuming zone is formed as a plate heat exchanger means arranged in the pivotable door, the plate heat exchanger means includes a projection extending into a region of a pivot axis of the vehicle door, a first end of the tubes of said bundle of tubes opens into said projection of the plate heat exchanger means, the heat-emitting zone is formed as a heat exchanger means arranged at a fixed point in an area of the pivot axis of the pivotable door, a second end of each of said tubes of said bundle of tubes is accommodated in the heat exchanger means in a heat transfer relationship, and in that the bundle of tubes are arranged concentrically to the pivot axis of the pivotable door.

10. A heat transfer system according to claim 9, characterized in that the bundle of tubes is constructed so as to be elastically deformable when subjected to a twisting stress during a pivoting of the pivotable door.

11. A heat transfer system according to claim 10, characterized in that the heat exchanger means is arranged in proximity to a floor of the motor vehicle.

12. A heat transfer system according to claim 9, characterized in that each of the tubes has an inside diameter in the range of about 3–5 mm.

13. A heat transfer system according to claim 12, characterized in that the bundle of tubes is construced so as to be elastically deformable when subjected to a twisting stress during a pivoting of the pivotable door.

14. A heat transfer system according to claim 13, characterized in that the heat exchanger means is arranged in proximity to a floor of the motor vehicle.

15. A heat transfer system arranged in a pivotable door of a motor vehicle for transferring heat between a heat-emitting zone and a heat-consuming zone in accordance with a heat pipe principle, characterized in that the heat-emitting zone and the heat-consuming zone are mounted for relative movement, a bundle of elastically deformable small tubes extending essentially in parallel to one another and movable relative to one another is arranged at least along a partial zone of the heat transfer path between both the heat-emitting zone and the heat-consuming zone for communicating the heat-emitting zone with the heat-consuming zone each individual tube of the bundle of small tubes is constructed so as to enable vapor produced in the heat-emitting zone to flow inside of the respective tubes into the heat-consuming zone and condensate produced in the heat-consuming zone to return to the heat-emitting zone, the heat-emitting zone is formed at a plate heat exchanger means arranged in the pivotable door, the plate heat exchanger means includes a projecting extending into a region of a pivot axis of the pivotable door, a first end of each of the tubes of said bundle of tubes opens into the projection of the plate heat-exchanger means, the heat-emitting zone is formed as a heat exchanger means arranged at a fixed point outside of the pivotable door, the bundle of tubes are arranged concentrically to the pivot axis of the pivotable door, and in that a heat pipe means is provided for operatively connecting a second end of each of the tubes of the bundle of tubes to the heat exchanger means.

16. A heat transfer system according to claim 15, characterized in that the bundle of tubes is constructed so as to be elastically deformable when subjected to a twisting stress during a pivoting of the pivotable door.

17. A heat transfer system according to claim 15, characterized in that each of the tubes has an inside diameter in the range of about 3–5 mm.

18. A heat transfer system according to claim 17, characterized in that the bundle of tubes is constructed so as to be elastically deformable when subjected to a twisting stress during a pivoting of the pivotable door.

19. A heat transfer system arranged in a pivotable door of a motor vehicle for transferring heat between a heat-emitting zone and a heat-consuming zone in accordance with a heat pipe principle, characterized in that the heat-emitting zone and the heat-consuming zone are mounted for limited relative movement, a bundle of elastically deformable small tubes extending essentially in parallel to one another and movable relative to one another is arranged at least along a partial zone of a heat transfer path between both the heat-emitting zone and the heat-consuming zone for communicating the heat-emitting zone with the heat-consuming zone, each individual tube of the bundle of small tubes is constructed so as to enable vapor produced in the heat-emitting zone to flow into the heat-consuming zone and condensate produced in the heat-consuming zone to return to the heat-emitting zone, the heat-emitting zone is formed as a plate heat exchanger means arranged in the pivotable door, the plate heat exchanger means includes a projection extending into a region of the pivot axis of the pivotable door, a first end of each of said tubes of the bundle of tubes opens into the projection of the plate heat exchanger means, the heat-emitting zone is formed as a heat pipe means including a portion disposed in a region of a pivot axis of the pivotable door, a second sealed end of each of the tubes of said bundle of tubes is accommodated in the portion of the heat pipe means disposed in the region of the pivot axis, and in that the bundle of tubes are arranged concentrically to the pivot axis of the pivotable door.

20. A heat transfer system according to claim 19, characterized in that the heat pipe means includes a first portion having a first diameter and a second enlarged elbow portion, the second enlarged elbow portion being arranged in the region of the pivot axis of the pivotable door so as to deflect a heat transfer in a direction of the bundle of tubes.

21. A heat transfer system according to claim 19, characterized in that each of the tubes has an inside diameter in the range of about 3–5 mm.

22. a heat transfer system according to claim 21, characterized in that the heat pipe means includes a first portion having a first diameter and a second enlarged elbow portion, the second enlarged elbow portion being arranged in the region of the pivot axis of the pivotable door so as to deflect a heat transfer in a direction of the bundle of tubes.

23. A heat pipe arrangement comprising a bundle of elastically deformable small tubes extending essentially parallel to one another and being operatively connected to each other so as to permit relative movement therebetween, at least one adjoining heat pipe means for accommodating one end of each of the tubes, each of said tubes is constructed as a heat pipe which is sealed toward the outside and open toward an interior of at least one adjoining heat pipe means so as to enable vapor produced in a heat-emitting zone to flow inside of the respective tubes into a heat-consuming zone and condensate produced in the heat-consuming zone to return inside of the respective tubes to the heat-emitting zone.

24. A heat pipe arrangement according to claim 23, wherein the at least one adjoining heat pipe includes a first section and an enlarged section for accommodating the ends of the tubes, and wherein the tubes of the bundle have a total cross-sectional area which is larger than a cross-sectional area of the first section of the at least one adjoining heat pipe means.

* * * * *